(12) United States Patent
Friedlander (10) Patent No.: US 9,055,256 B2
(45) Date of Patent: Jun. 9, 2015

(54) ON SCREEN PROGRAMMING OF UNIVERSAL REMOTE CONTROL FEATURES

(75) Inventor: Steven Friedlander, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 522 days.

(21) Appl. No.: 12/902,777

(22) Filed: Oct. 12, 2010

(65) Prior Publication Data

US 2011/0085083 A1   Apr. 14, 2011

Related U.S. Application Data

(60) Provisional application No. 61/251,065, filed on Oct. 13, 2009.

(51) Int. Cl.
*G08B 21/00* (2006.01)
*H04N 5/44* (2011.01)
*H04N 21/422* (2011.01)

(52) U.S. Cl.
CPC .......... *H04N 5/4403* (2013.01); *G08C 2201/20* (2013.01); *H04N 2005/4439* (2013.01); *H04N 21/42227* (2013.01)

(58) Field of Classification Search
CPC .................. G08C 2201/20; H04N 2005/4439; H04N 21/42227; H04N 5/4403
USPC ........ 340/426.13, 426.14, 4.11, 12.22–12.26; 341/176; 348/734
See application file for complete search history.

(56) References Cited

U.S. PATENT DOCUMENTS

| | | | |
|---|---|---|---|
| 6,208,341 B1 * | 3/2001 | van Ee et al. | 715/716 |
| 6,239,718 B1 * | 5/2001 | Hoyt et al. | 340/12.24 |
| 6,909,378 B1 | 6/2005 | Lambrechts et al. | |
| 7,218,243 B2 | 5/2007 | Hayes et al. | |
| 2005/0108751 A1 * | 5/2005 | Dacosta | 725/39 |
| 2006/0152401 A1 * | 7/2006 | Spilo | 341/176 |
| 2006/0267726 A1 * | 11/2006 | Arai et al. | 340/3.71 |
| 2008/0224915 A1 | 9/2008 | Unger et al. | |
| 2009/0109345 A1 * | 4/2009 | Nori | 348/721 |
| 2009/0231178 A1 | 9/2009 | Letourneur et al. | |

FOREIGN PATENT DOCUMENTS

KR   20040087776 A   10/2004

OTHER PUBLICATIONS

"Philips Prestigo SRT9320 Universal Remote Mixes Touch Screen with Hard Keys"—downloaded on the Internet at http://ces/cnet.com/8301-191671-101125015-100.html, Dec. 16, 2008, 1 page.

* cited by examiner

*Primary Examiner* — Mark Rushing
(74) *Attorney, Agent, or Firm* — John P. O'Banion (57) ABSTRACT

A system for remotely controlling one or more components coupled to a display or TV. Remote application software is provided on the TV for communicating a first signal between remote control and the processor via a receiver coupled to the processor, the remote application software comprises a graphical user interface for output on the, wherein the graphical user interface allows a user to assign the buttons on the remote keypad first to one or more commands that operate one or more external devices coupled to the display.

21 Claims, 5 Drawing Sheets

ON SCREEN PROGRAMMING OF UNIVERSAL REMOTE CONTROL FEATURES

CROSS-REFERENCE TO RELATED APPLICATIONS

This application claims priority from U.S. provisional application Ser. No. 61/251,065 filed on Oct. 13, 2009, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to remote controls, and more particularly to programmable remote controls.

2. Description of Related Art

Remote controls have become commonplace for most audio/video home theatre and entertainment systems and components. Thus, a user must operate a number of remotes [e.g. monitor/TV, set top box, DVD, game console, amplifier, etc.], or program a universal remote control. Existing universal remote controls are difficult to program and many people don't take advantage of their features because of this difficulty.

More advanced universal remotes use the PC to affect programming the remotes and customization of features. However, this requires that the user to be pretty savvy with a PC and own a PC to do the programming.

Accordingly, an object of the present invention is a TV based remote control that is easy to program. At least some of these objections will be met in the following description.

BRIEF SUMMARY OF THE INVENTION

An aspect of the present invention is a system for remotely controlling one or more components coupled to a display. The system includes a display, a processor coupled to the display, remote application software executable on said processor, a remote control comprising a first wireless transmitter for communicating a first signal between remote control and the processor; and a receiver coupled to the processor for receiving the first signal from the remote control. The remote application software comprises a graphical user interface for output on the display, wherein the graphical user interface is configured to assign the first signal to one or more commands configured to operate one or more external devices coupled to the display.

Another aspect is a universal remote control system for television. The remote control system comprises a television having a display, a processor, remote application software executable on the processor, and a receiver configured for receiving a first signal and a remote control comprising a first wireless transmitter for communicating the first signal between remote control and the processor. The remote application software includes a graphical user interface for output on the display, wherein the graphical user interface is configured to assign the first signal to one or more commands configured to operate one or more external devices coupled to the display. A second wireless transmitter may be coupled to the processor, and be configured for wirelessly transmitting a command signal corresponding to the one or more commands.

Another aspect is a system for remotely controlling one or more external components coupled to a display. The system includes a remote with a keypad having individual buttons for controlling the display, a processor and memory coupled to the processor, and software executable on the processor for carrying out the steps of: providing a graphical user interface for output on the display, designating the one or more external components coupled to the display on the graphical user interface, retrieving manufacturer settings relating to reception of remote commands for the one or more external components and storing the settings in memory, providing fields in the graphical user interface for assigning one or more functions to the keypad, wherein the functions comprise commands of the one or more components based on the retrieved manufacturer settings, and storing the function assignments in memory.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

Figure 1:
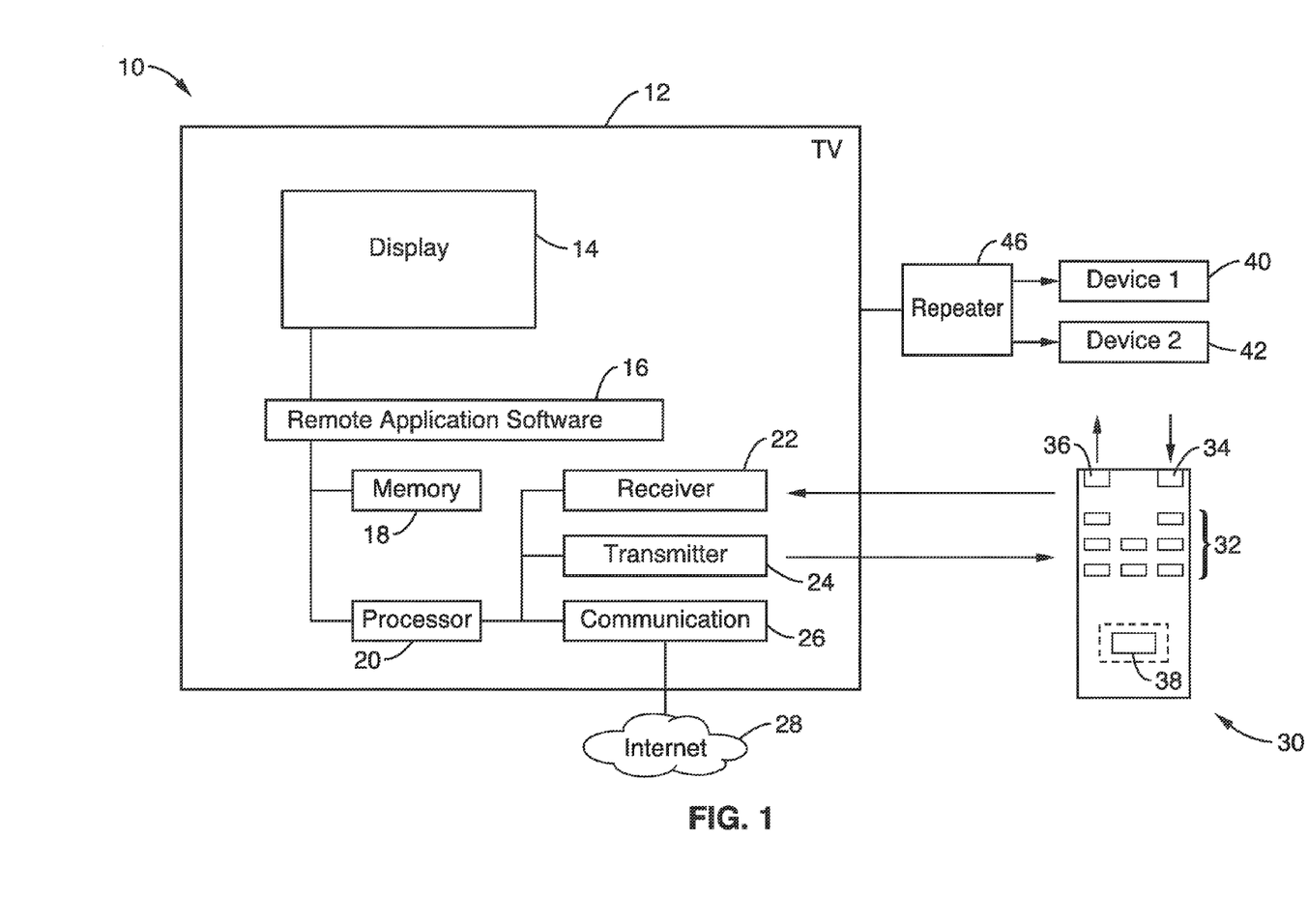
FIG. 1 is a schematic diagram of a programmable universal remote control in accordance with the present invention.

FIG. 1 is a schematic diagram of a programmable universal remote control system 10 in accordance with the present invention. System 10 includes a remote 30 and TV 12 comprising remote application software module 16 for programming system 10 for operating remote 30, TV 12 and other devices 40 and 42 that may be coupled to and/or cooperate with TV 12.

In a preferred embodiment, the remote application software 16 is contained within memory 18 and processed with processor 20 of the TV 12, so that the remote 30 can be a relatively "dumb" device that does not require significant memory or processing power to operate. This not only helps to minimize the cost of the remote, but also allows lower power consumption from the remote to prolong battery life. The TV 12 may have a transmitter 24 for sending signals and commands to the remote 30, and receiver 22 for receiving commands from the remote 30. The TV 12 may act as a repeater when receiving a command from remote 30 by transmitting the command signal via transmitter 24 to one or more devices 40, 42.

In one embodiment, remote 30 may comprise a transmitter 36 for sending commands to the TV 12. The transmitter 34 may also be configured to control other devices 40, 42, or may be configured to just communicate with the TV 12 and use the TV 12 transmitter 24 or repeater 46 to communicate with devices 40, 42 (described in further detail below). The remote 30 may also comprise a receiver 34 for receiving commands from the TV 12. The receivers 22, 34 and transmitters 24, 36 may operate under any wireless medium or combination of wireless mediums, e.g. infrared (IR), radiofrequency (RF), or other transmission means known in the art).

The TV 12 also preferably comprises communication means 26 for interfacing through either a wired (e.g. Ethernet) or wireless connection (e.g. wifi, Bluetooth, etc.) to the Internet 28. In a preferred embodiment, TV 12 comprises an IPTV (Internet Protocol Television). In such a configuration, Internet television services are delivered using the architecture and networking methods of the Internet protocol suite over a packet-switched network infrastructure, e.g., the Internet 28 and broadband Internet access networks, instead of being delivered through traditional radio frequency broadcast, satellite signal, and cable television (CATV) formats.

Via communication module 26, the TV 12 may communicate over the Internet 28 to access and or update data relating to manufacturer control settings for various component devices (e.g. devices 40 and 42).

Remote 30 will generally comprise a touchpad 32 for controlling the TV and devices 40 and 42. Remote 30 may also comprise a circuit board 38 having a simple processor and memory for storing and generating command signals that are assigned to the various keypad 32 buttons.

Figure 2:
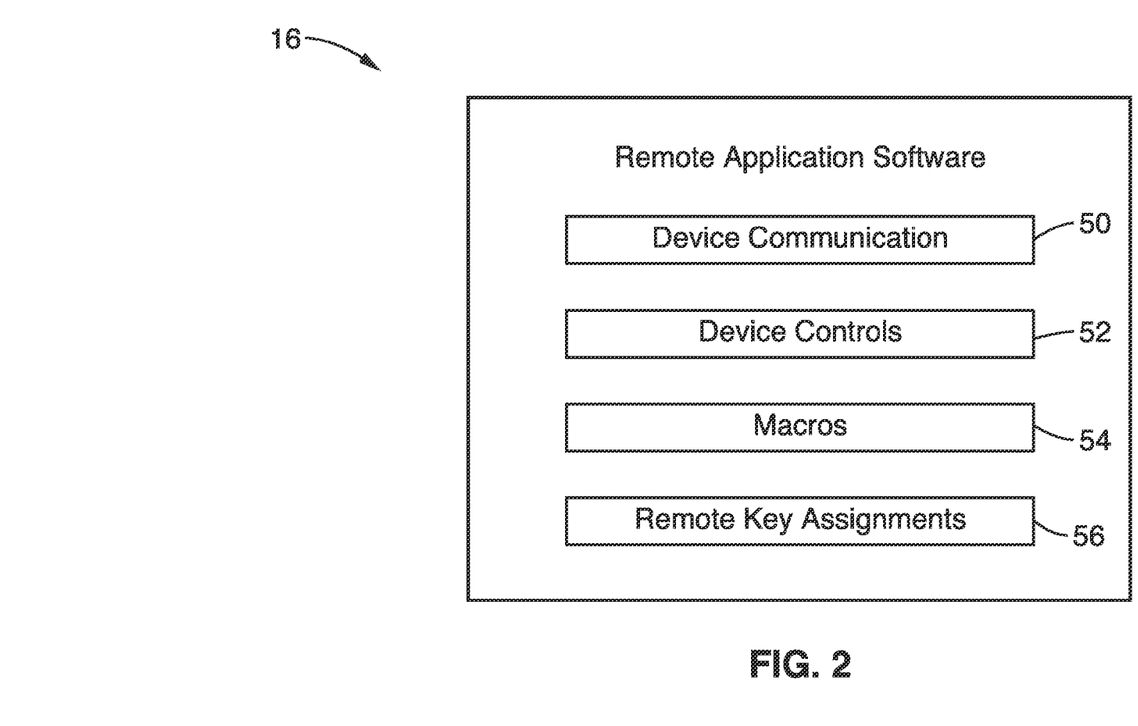
FIG. 2 is a schematic diagram of application software of the programmable universal remote control of FIG. 1.

FIG. 2 illustrates a schematic diagram of remote application software 16 for the programmable universal remote control 30 of FIG. 1. The application software 16 comprises a plurality of modules that have different functions in programming and or controlling remote 30 and devices 40, 42.

The software 16 will have a communication module 50 that allows for the communication between the TV and remote 30, devices 40, 42 (e.g. via transmitter 24 and receiver 22), and to other networks/servers over communications port 26 and Internet 28.

Application software further comprises a device controls module 52 that comprises various commands/instructions that may be stored (e.g. via a database within memory 18) for the various devices in the near vicinity (e.g. command codes from the manufacturer of the devices). The device controls may be uploaded to the TV 12 memory via the application software 16 accessing the codes over the Internet 28.

The software 16 may also comprise a module for generating macros 54 for operating one or more devices 40, 42 and TV12. A macro is generally a series of commands that you can program onto a single activity. For example, to turn on the TV 12, DVD player (e.g. device 1 (40)), and receiver (device 2(42)) to watch a movie, all of those separate steps can be combined into one macro or activity. This lets you turn on all three components with a single button push.

The application software 16 may also include a module 56 for generating/programming and storing key assignments. Thus, each key of key pad 32 may comprise a programmed command according to the user's preferences to control one or more devices in a certain fashion (e.g. certain keys may be used to control volume, channel, menu, playback and other commands, and toggle between devices.) These keypad function assignments may then be stored in a database in module 56.

Figure 3A:
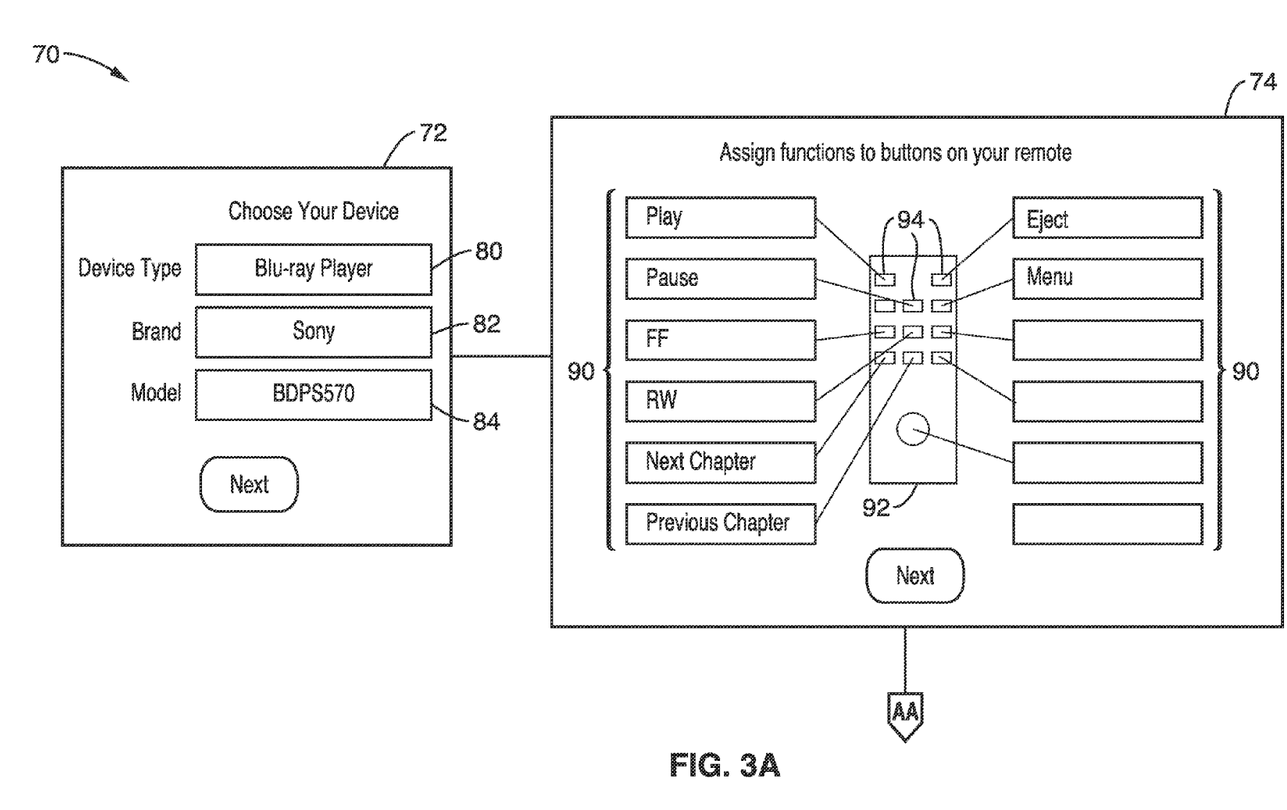
FIGS. 3A and 3B illustrate a series of programming screens for programming a universal remote control in accordance with the present invention.
Figure 3B:
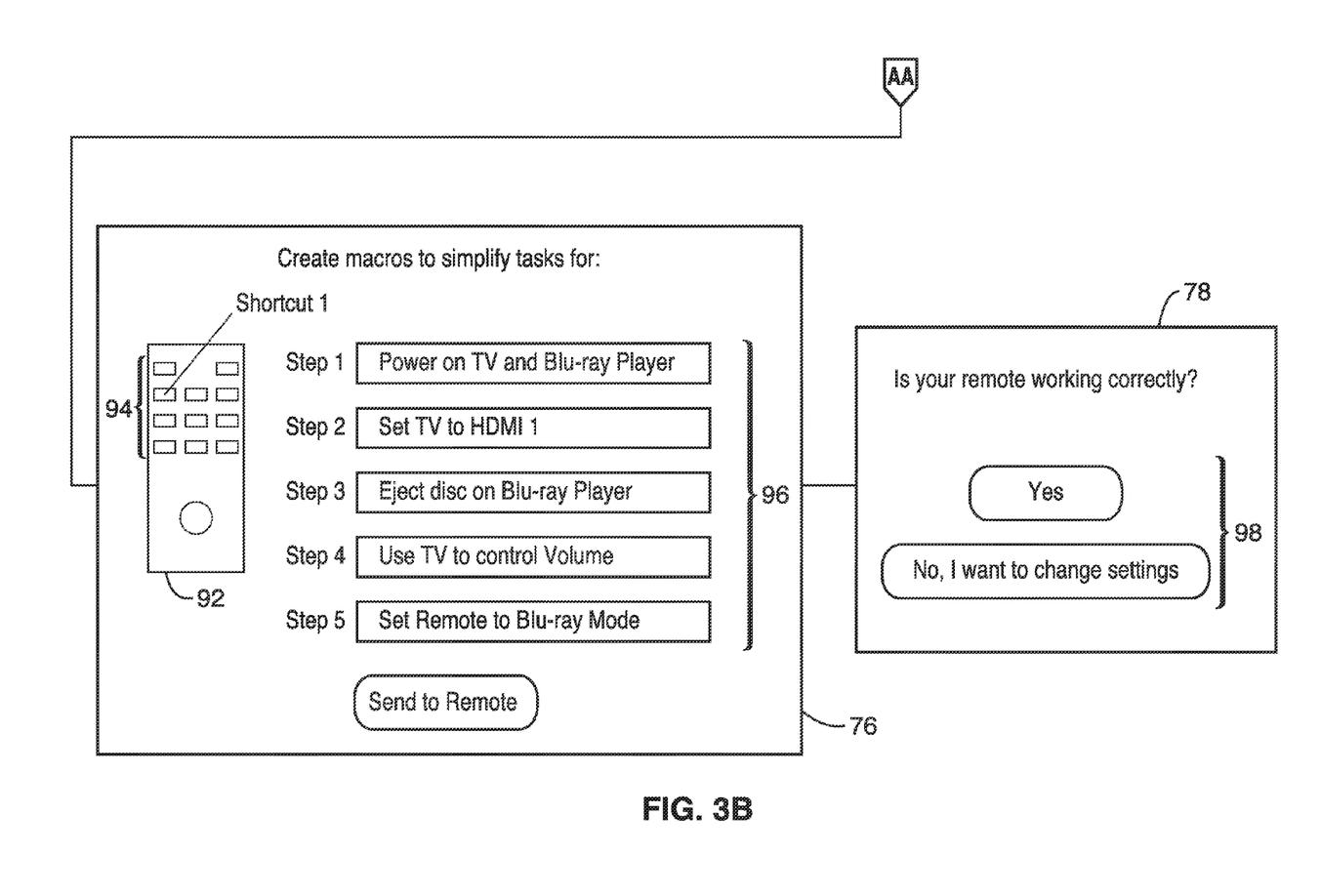

FIGS. 3A and 3B illustrate a series of programming screens for programming the universal remote control 30 of the present invention. Generally, the application software will already be programmed to operate the TV 12 from the remote 30. Because the TV 12 is typically operating as a monitor (typically channel settings are controlled by a set top box, and volume audio is a function of an amplifier/receiver), the most popular remote functions are on/off, and display settings (e.g. contrast, color, inputs, etc.). Typically, channel settings are controlled by a set top box, and volume/audio features are a function of an amplifier/receiver.

Referring to FIG. 3A, the first step in programming the remote 30 and remote application software 16 is to identify the device and or devices (e.g. component devices 40 and 42) to be programmed. Upon entering a programming mode (which may appear automatically at initiation of the device), the application software 16 is configured to display device selection screen 72 on monitor, which allows a user to select the device type 80 (e.g. Blu-ray player, amplifier/receiver, monitor/TV, VCR, gaming console, set top box, satellite receiver, etc.). The brand 82 and model 84 are then also selected. The device type 80 brand 82 and model 84 may be selected from drop down-menus 90 and/or by typing model or brand keyboard (either on-screen or via touchpad 32). The drop-down menus 90 may be populated by a database (e.g. device controls database 52) stored in the memory 18, and/or downloaded automatically via communication port 26 to an off-site database or series of databases found on the Internet 28. The database 52 may have the command codes for the specified device, or be configured to search over the network to find the device and or associated command codes.

Once the codes are acquired for the specific device, the software generates an assign functions screen 74, wherein the user may select which of the buttons on keypad 32 corresponds with the specific commands. The screen 74 generates a visual model 92 of the remote 30, with a visual model 94 of keypad 32. Once the user assigns functions to the desired corresponding keys 32, the settings are saved within database 56.

Generally, the keypad 32 will have symbols that correspond with generally accepted standards (e.g. "stop" function is a solid square, and "pause" is two parallel vertical lines). However, the user may program the functions to any key as desired. In an alternative embodiment, the remote may comprise a touch-screen (not shown) instead or in addition to physical buttons of keypad 32. In this configuration, the touch screen may be programmed to contain distinct icons for individual functions of each device, and program the function of each icon.

With the functions of one or more devices 40, 42 programmed, the user may also be able to program one or more macros via macro programming screen 76. For example, the user may identify a particular mode (e.g. view Blu-ray) which corresponds to a series of steps 96 (e.g. turn on TV 12 and device 40, set TV input to HDMI, eject Blu-ray for inserting disc, use TV 12 (or device 42 amplifier) as volume to control, and set the remote 30 in Blue ray mode to operate playback functions programmed for the Blu-ray device 40. The macros may be saved within memory 18 of the TV 12 in a specified macro database 54.

At screen 78, the user may test the functions directly in real time to see if the remote functions as desired, and change or accept the settings accordingly via options 98.

In a preferred embodiment, the remote commands programmed to control each of the devices (TV 12, device 1(40) device 2(42), etc), and macros are stored within memory of TV 12. Thus, when a command is entered from pressing a key 32 on remote 30, the signal may be only communicated to the TV 12, and may be of any type of signal that the TV 12 may be programmed to understand.

More specifically, the signal from the depressed key 32 of remote 30 may be of a type that has no resemblance with the command that controls devices 40 or 42, but is identifiable by the application software 16, which then sends a second command signal out transmitter 24 that does correspond to the command code for the specific device 40, 42.

This allows the communication to and from the remote 30 to be of a different type (e.g. RF instead of IR) and of a preferred frequency or signal characteristic that is unbounded, as it is not related to the actual signal that the device 40, 42 is specified to receive. For example, the "play" command for device 40 may be arbitrarily set to be a particular RF frequency that is not related the IR signal that device 40 would understand for "play," but is picked up by the receiver 22 and recognized by the application software 16, which then broadcasts the appropriate IR signal that will be recognized by the device. Thus, the remote may use technology such as RF that beneficially allows for non line-of-sight or long-distance recognition of the remote, while negating some of the drawbacks of that technology. Because RF is prone to interference from other household devices (e.g. cordless phones, etc), the ability to pick and choose within the spectrum from a finite number of arbitrary commands can greatly improve performance and minimize interference.

The TV 12 may also comprise a repeater 46, which repeats the signal from a vantage point that is more in the line-of-sight of the components 40, 42. Repeater 46 may be wired, or wireless, and may comprise a plurality of transmitters that allow simultaneous broadcast of different signals to different devices (e.g. turn amplifier and DVD player on simultaneously with TV 12). This allows for control of devices 40 and 42 from within a cabinet or the like, so that the devices 40, 42 may be hidden from view if so desired. Because the monitor/TV is generally in view to be viewed, it becomes the ideal base for reception and repeating of signals sent by the remote 30.

In its most basic form, remote 30 may merely comprise a transmitter 36 for transmitting a one-way communication signal between the remote 30 and the processor of the TV 12 (e.g. no receiving element 34 is necessary, only receiving element 22 for the TV 12). In this configuration, the application software 16 is configured to recognize the signal pertaining to the button on keypad 32 being selected. The application software 16 would then be configured to broadcast a command signal (e.g. via transmitter 24 or repeater 46) pertaining to a pre-assigned function for operation of the one or more devices 40, 42. One button in the keypad 32 may correspond to a device selection button, such that any other button selected subsequent to pushing the device selection button is designated for controlling an assigned function on that device.

Figure 4:
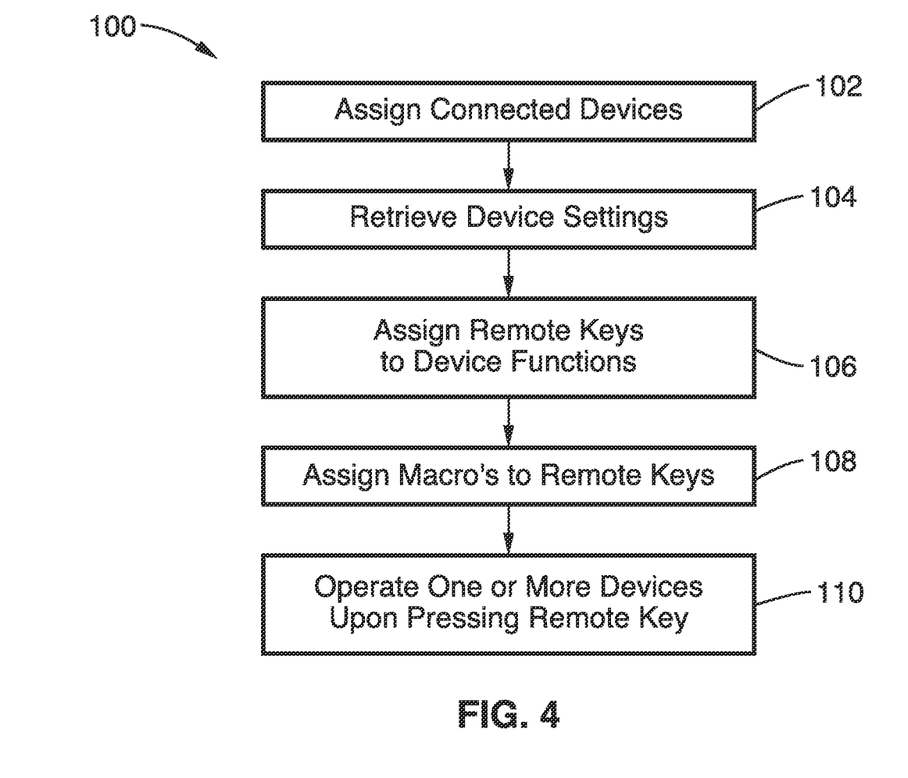
FIG. 4 illustrates a method for programming a universal remote control in accordance with the present invention.

FIG. 4 illustrates a method 100 for programming the universal remote control 30 in accordance with the present invention. First, the connected devices are assigned to corresponding device-type, manufacturer and model at step 102 and device settings are retrieved at step 104. In one embodiment, certain types of devices (e.g. HDMI) may be automatically sensed by the application software 16, which then pulls the proper command codes automatically from database 52, or over the internet.

Next, the remote keys/buttons of keypad 32 are assigned to various functions of the selected device 40, 42 as desired by the user in step 106. These assignments are preferably stored locally within database 56. Next, the user may assign macros at step 108. Finally, at step 110 the user may operate one or more of the devices 12, 40, 42 by selecting a desired remote key 32.

The above embodiments are all detailed in relation to a TV as the base device for operating and storing the remote functionality. However, it is appreciated that other devices, e.g. a set top box, may also be used to program and store settings relating to a universal remote that controls and communicates with the set top box. Thus, the set top box would contain the memory 18, application software 16, and processor for controlling graphical output for programming the remote through on-screen fields on display 14 of TV 12.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A system for remotely controlling one or more components coupled to a display, comprising: a display; a processor coupled to the display; remote application software executable on said processor; a remote control comprising a first wireless transmitter for communicating a first signal between remote control and the processor; a receiver coupled to the processor, the receiver configured for receiving the first signal from the remote control; wherein the remote application software comprises a graphical user interface for output on said display; said graphical user interface configured to assign the first signal to one or more commands; the one or more commands configured to operate one or more external devices coupled to the display.

2. A system as recited in embodiment 1: wherein the remote comprises a keypad comprising one or more buttons; the one or more buttons configured to designate a unique command transmitted as the first signal; wherein the remote application software is configured to assign one or more buttons to the one or more commands.

3. A system as recited in embodiment 1, further comprising: a second wireless transmitter coupled to the processor; the second wireless transmitter configured for wirelessly transmitting a command signal corresponding to the one or more commands to the one or more external devices.

4. A system as recited in embodiment 3, further comprising: a port coupled to the processor; the port configured to allow downloading of manufacturer settings from an external network; wherein the manufacturer settings are used to generate the one or more command signals corresponding to the one or more devices.

5. A system as recited in embodiment 3, wherein the display, processor, remote application software, and second wireless transmitter are components of a television.

6. A system as recited in embodiment 3, wherein the first signal is a different frequency from the command signal.

7. A system as recited in embodiment 3, wherein the first signal is an RF signal.

8. A system as recited in embodiment 7, wherein the command signal is an IR signal.

9. A system as recited in embodiment 3, wherein the command signal is stored in memory coupled to the processor.

10. A universal remote control for television, comprising: a television comprising: a display; a processor coupled to the display; remote application software executable on said processor; a receiver coupled to the processor, the receiver configured for receiving a first signal; a remote control comprising a first wireless transmitter for communicating the first signal between remote control and the processor; wherein the remote application software comprises a graphical user interface for output on said display; said graphical user interface configured to assign the first signal to one or more commands; the one or more commands configured to operate one or more external devices coupled to the display; and a second wireless transmitter coupled to the processor; the second wireless transmitter configured for wirelessly transmitting a command signal; the command signal corresponding to the one or more commands.

11. A universal remote control as recited in embodiment 10: wherein the remote comprises a keypad comprising one or more buttons; the one or more buttons configured to designate a unique command transmitted as the first signal; wherein the remote application software is configured to assign one or more buttons to the one or more commands.

12. A universal remote control as recited in embodiment 10, further comprising: a port coupled to the processor; the port configured to allow downloading of manufacturer settings from an external network; wherein the manufacturer settings are used to generate the one or more command signals corresponding to the one or more devices.

13. A universal remote control as recited in embodiment 10, wherein the first signal is a different frequency than the command signal.

14. A universal remote control as recited in embodiment 12, wherein the first signal is an RF signal.

15. A universal remote control as recited in embodiment 14, wherein the command signal is an IR signal.

16. A universal remote control as recited in embodiment 10, wherein the command signal is stored in memory coupled to the processor.

17. A system for remotely controlling one or more external components coupled to a display, comprising: a display; a remote coupled to said display; the remote comprising a keypad with individual buttons for controlling said display; a processor coupled to the display; memory coupled to said processor; software executable on said processor for carrying out the steps of; providing a graphical user interface for output on said display; designating the one or more external components coupled to the display on said graphical user interface; retrieving manufacturer settings relating to reception of remote commands for the one or more external components and storing said setting in said memory; providing fields in said graphical user interface for assigning one or more functions to said keypad, said functions comprising commands of the one or more components based on said retrieved manufacturer settings; and storing said function assignments in said memory.

18. A system as recited in embodiment 17, further comprising: a wireless receiver and transmitter coupled to the processor; wherein the software is further configured to: receive a first signal from the remote through the wireless receiver; analyze the first signal to determine a specific button selection on said remote keypad; retrieve said manufacturer settings according to said stored assignments; generating a command signal based on the selected button and assigned manufacturer settings; and transmitting a command signal via the wireless transmitter to control the one or more external components.

19. A system as recited in embodiment 18, wherein the software is further configured to: provide fields in the graphical user interface for assigning a macro to a designated button on said remote keypad; said macro relating to a series of functions to control the one or more external components in response to selection of said designated button.

20. A system as recited in embodiment 18, wherein the display, processor, memory, software and wireless transmitter and receiver are components of a television.

21. A system as recited in embodiment 18, wherein the first signal is transmitted at a different frequency from the command signal.

22. A system as recited in embodiment 21, wherein the first signal is an RF signal.

23. A system as recited in embodiment 22, wherein the command signal is an IR signal.

24. A system as recited in embodiment 18, wherein the one or more components comprise one or more of a: set top box, receiver, DVD player, CD player, Blu-ray player, gaming console, and amplifier.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A system for remotely controlling one or more components, comprising:
    a display;
    a processor coupled to the display;
    remote application software executable on said processor and stored solely in memory on said display;
    a remote control comprising a first wireless transmitter for communicating a first signal between the remote control and the processor;
    wherein the remote control comprises a keypad comprising one or more buttons;
    the one or more buttons configured to designate a unique command transmitted as the first signal; and
    a receiver coupled to the processor, the receiver configured for receiving the first signal from the remote control;
    wherein the remote application software comprises a graphical user interface for output on said display;
    said graphical user interface configured to allow user programming of the remote control to assign one of the one or more buttons to correspond to one or more commands;
    the one or more commands configured to operate one or more external devices coupled to the display;
    said graphical user interface further comprising fields for assigning a macro to a single designated button on said remote keypad; and
    said macro relating to a series of functions to individually control a plurality of the one or more external components in response to a single selection of said designated button.

2. The system as recited in claim 1, further comprising:
    a second wireless transmitter coupled to the processor;
    the second wireless transmitter located at said display and acting as a repeater for wirelessly transmitting a second signal comprising a command signal to control operation of the one or more external devices in response to the one or more commands of the first signal transmitted by the remote control.

3. The system as recited in claim 2, further comprising:
    a port coupled to the processor;
    the port configured to allow downloading of manufacturer settings from an external network;
    wherein the manufacturer settings are used to generate the one or more command signals corresponding to the one or more devices.

4. The system as recited in claim 2, wherein the display, processor, remote application software, and second wireless transmitter are components of a television.

5. The system as recited in claim 2, wherein the first signal is a different frequency than the second signal.

6. The system as recited in claim 2, wherein the first signal is an RF signal.

7. The system as recited in claim 6, wherein the second signal is repeated as an IR signal.

8. The system as recited in claim 2, wherein the second signal is stored in memory coupled to the processor.

9. A universal remote control system, comprising:
    a television comprising:
    a display;
    a processor coupled to the display;
    remote application software executable on said processor and stored solely in memory on said TV;
    a receiver coupled to the processor, the receiver configured for receiving a first signal;
    a remote control comprising a first wireless transmitter for communicating the first signal between the remote control and the processor;
    wherein the remote control comprises a keypad comprising one or more buttons;
    the one or more buttons configured to designate a unique command transmitted as the first signal;
    wherein the remote application software comprises a graphical user interface for output on said display;
    said graphical user interface configured to allow user programming of the remote control to assign one of the one or more buttons to correspond to one or more commands;
    the one or more commands configured to operate one or more external devices coupled to the display; and
    a second wireless transmitter on said TV and coupled to the processor;
    the second wireless transmitter acting as a repeater for wirelessly transmitting a second signal comprising the unique command; and
    the second signal being configured to control operation of the one or more external devices in response to the one or more commands transmitted by the remote control.

10. The universal control system as recited in claim 9, further comprising:
    a port coupled to the processor;
    the port configured to allow downloading of manufacturer settings from an external network; and
    wherein the manufacturer settings are used to generate the one or more command signals corresponding to the one or more devices.

11. The universal control system as recited in claim 10, wherein the first signal is an RF signal.

12. The universal control system as recited in claim 11, wherein the second signal is an IR signal.

13. The universal control system as recited in claim 9, wherein the first signal is a different frequency than the second signal.

14. The universal control system as recited in claim 9, wherein the second signal is stored in memory coupled to the processor.

15. A system for remotely controlling one or more external components, comprising:
- a display;
- a remote coupled to said display;
- the remote comprising a keypad with individual buttons for controlling said display;
- a processor coupled to the display;
- memory coupled to said processor;
- software stored solely in memory on said display and executable on said processor for carrying out the steps of:
  - providing a graphical user interface for output on said display;
  - designating the one or more external components coupled to the display on said graphical user interface;
  - retrieving manufacturer settings relating to reception of remote commands for the one or more external components and storing said-manufacturer settings in said memory;
  - providing fields in said graphical user interface for assigning one or more functions to said keypad, said functions comprising commands of the one or more components based on said retrieved manufacturer settings;
  - storing said function assignments in said memory; and
  - providing fields in the graphical user interface for assigning a macro to a single designated button on said remote keypad; and
  - said macro relating to a series of functions to individually control a plurality of the one or more external components in response to a single selection of said designated button.

16. The system as recited in claim 15, further comprising:
a wireless receiver and transmitter coupled to the processor;
wherein the software is further configured to:
  - receive a first signal from the remote through the wireless receiver;
  - analyze the first signal to determine a specific button selection on said remote keypad;
  - retrieve said manufacturer settings according to said stored assignments;
  - generate a command signal based on the selected button and assigned manufacturer settings; and
  - transmit the command signal via the wireless transmitter to control the one or more external components.

17. The system as recited in claim 16, wherein the display, processor, memory, software and wireless transmitter and receiver are components of a television.

18. The system as recited in claim 16, wherein the first signal is transmitted at a different frequency from the command signal.

19. The system as recited in claim 18, wherein the first signal is an RF signal.

20. The system as recited in claim 19, wherein the command signal is an IR signal.

21. The system as recited in claim 16, wherein the one or more components comprise one or more of a: set top box, receiver, DVD player, CD player, Blu-ray player, gaming console, and amplifier.

* * * * *